US005164904A

United States Patent [19]

Sumner

[11] Patent Number: 5,164,904

[45] Date of Patent: Nov. 17, 1992

[54] IN-VEHICLE TRAFFIC CONGESTION INFORMATION SYSTEM

[75] Inventor: Roy L. Sumner, Vienna, Va.

[73] Assignee: Farradyne Systems, Inc., Rockville, Md.

[21] Appl. No.: 557,743

[22] Filed: Jul. 26, 1990

[51] Int. Cl.[5] .................... G06F 15/50

[52] U.S. Cl. .................... 364/436; 340/905

[58] Field of Search .................... 364/436, 449, 450; 340/990, 995, 905

[56] References Cited

U.S. PATENT DOCUMENTS

| | | | |
|---|---|---|---|
| 2,980,887 | 4/1961 | Soderberg | 340/934 |
| 3,056,121 | 9/1962 | Jackson | 246/2 R |
| 3,237,154 | 2/1966 | Barker | 340/934 |
| 3,275,984 | 9/1966 | Barker | 340/934 |
| 3,345,503 | 10/1967 | Auer, Jr. | 364/437 |
| 3,506,808 | 4/1970 | Riddle, Jr. et al. | 364/437 |
| 3,626,413 | 12/1971 | Zachmann | 342/104 |
| 3,710,081 | 1/1973 | Apitz | 364/436 |
| 3,711,686 | 1/1973 | Apitz | 364/437 |
| 3,774,147 | 11/1973 | Hendricks | 340/910 |
| 3,872,422 | 3/1975 | Obermaier et al. | 340/909 |
| 3,885,227 | 5/1975 | Moissl | 340/916 |
| 3,899,671 | 8/1975 | Stover | 340/905 |
| 3,906,438 | 9/1975 | Kohnert | 340/934 |
| 3,916,374 | 10/1975 | Drebinger et al. | 340/909 |
| 3,919,686 | 11/1975 | Narbaits-Jaureguy et al. | 340/993 |
| 4,014,503 | 3/1977 | Raimer | 246/34 R |
| 4,023,017 | 5/1977 | Ceseri | 364/437 |
| 4,087,066 | 5/1978 | Bahker et al. | 246/167 R |
| 4,087,067 | 2/1978 | Bahker et al. | 246/167 R |
| 4,290,136 | 9/1981 | Brunner et al. | 371/25.1 |
| 4,296,400 | 10/1981 | Friedbert et al. | 340/989 |
| 4,303,905 | 12/1981 | Drebinger | 340/922 |
| 4,323,970 | 4/1982 | Brunner et al. | 364/436 |
| 4,350,970 | 9/1982 | von Tomkewitsch | 340/989 |
| 4,352,086 | 9/1982 | Hunziker | 340/906 |
| 4,357,593 | 11/1982 | von Tomkewitsch | 340/988 |
| 4,369,427 | 1/1983 | Drebinger et al. | 340/941 |
| 4,380,821 | 4/1983 | Eckhardt | 455/33 |
| 4,398,171 | 8/1983 | Dahan et al. | 340/901 |
| 4,409,583 | 10/1983 | Dahan et al. | 340/995 |
| 4,561,115 | 12/1985 | Pfeifer | 455/228 |
| 4,630,209 | 12/1986 | Saito et al. | 364/444 |
| 4,633,517 | 12/1986 | Pfeifer | 455/228 |
| 4,713,661 | 12/1987 | Boone et al. | 340/994 |
| 4,729,907 | 12/1988 | Ikeda et al. | 427/64 |
| 4,748,681 | 5/1988 | Schmidt | 455/33 |
| 4,780,717 | 10/1988 | Takanabe et al. | 340/995 |
| 4,792,803 | 12/1988 | Madnick et al. | 340/905 |
| 4,812,980 | 3/1989 | Yamada et al. | 340/449 |
| 4,819,174 | 4/1989 | Furuno et al. | 364/444 |
| 4,819,175 | 4/1989 | Wuttke | 364/449 |

FOREIGN PATENT DOCUMENTS

| | | |
|---|---|---|
| 290679 | 11/1988 | European Pat. Off. |
| 3129094 | 7/1981 | Fed. Rep. of Germany |
| 54-121383 | 9/1979 | Japan |
| 54-151301 | 11/1979 | Japan |
| 58-201433 | 11/1983 | Japan |
| 1-43715 | 2/1989 | Japan |
| 1-44599 | 2/1989 | Japan |
| 2050767 | 1/1981 | United Kingdom |

*Primary Examiner*—Thomas G. Black

*Attorney, Agent, or Firm*—Banner, Birch, McKie & Beckett

[57] ABSTRACT

The In-Vehicle Traffic Congestion Information System (ICI system) consists of a technique to provide real-time traffic congestion data to drivers of suitably equipped vehicles. The ICI system includes apparatus for gathering and formatting data at a central location, transmitting the data to vehicles, processing data in the vehicles and presenting it to the drivers. The ICI system design provides inputs for a wide range of data sources at a central location where, through a data fusion process, information from a range of sources may be accumulated and aggregated into a single congestion level data value for each section of road. In the vehicles, a range of options may be available for presenting relevant congestion data to the driver including text, voice and map displays.

29 Claims, 5 Drawing Sheets

IN-VEHICLE TRAFFIC CONGESTION INFORMATION SYSTEM

STATEMENT OF GOVERNMENT INTEREST

The U.S. Government has a paid-up license in this invention and the right in limited circumstances to require the patent owner to license others on reasonable terms as provided for by the terms of Contract No. DTFH61-88-C-00080 awarded by the Federal Highway Administration.

This application is related by subject matter to commonly assigned, copending applications Ser. Nos. 557,741 and 557,742, filed concurrently herewith.

BACKGROUND OF THE INVENTION

1. Field Of The Invention

The present invention generally relates to systems for monitoring motor vehicle traffic conditions on highways and, more particularly, to an improved traffic congestion information system for use by drivers in avoiding areas of traffic congestion.

2. Description Of The Prior Art

A number of systems now exist that monitor traffic conditions and transmit traffic information to individual motor vehicles. A typical system of this type is described in U.S. Pat. No. 4,792,803 to Madnick et al. In the Madnick system, an information receiving and analyzing computer accepts a variety of inputs from different traffic condition monitors, such as vehicle counting devices (i.e., proximity sensors buried in the pavement), video cameras mounted along the highways, and human inputs such as verbal traffic reports from the ground and aircraft, or accident reports. Since the reliability of such "anecdotal" data can vary from source to source, these human inputs must be evaluated by human beings and inserted into the system. The system then synthesizes and transmits over the airwaves a verbal traffic message for each of sixteen geographical "zones" designated within the overall traffic monitoring area. In a motor vehicle equipped with a suitable receiver, a driver presses one of sixteen pushbuttons at the receiver to activate the verbal traffic message corresponding to a specific zone of interest.

Although the traffic information provided by such conventional traffic monitoring and reporting systems as described in Madnick can be of some use to motor vehicle operators, it appears that the usefulness of the information is limited by certain operational drawbacks and inefficiencies of the conventional systems. For example, the narrowness of the broadcast bandwidths allocated for transmitting conventional traffic messages or reports limits the number of messages that can be transmitted at one time. Consequently, only a limited number of geographical zones may be designated or available within a given broadcast bandwidth. Moreover, traffic patterns within some zones typically are not uniform. As a consequence, there can be many different forms of congestion within a zone, which suggests the need to broadcast more than one message for that zone. Conversely, there may be no congestion in a number of zones, in which case no traffic messages or information would have to be broadcast with respect to those zones. In other words, individual drivers can select messages from among the zones, but cannot discriminate with messages from particular areas within the zones. Consequently, from one viewpoint, drivers utilizing the present traffic monitoring systems are subject to "information overload," wherein a plurality of zone-wide messages are received but only a few of the messages are of interest to particular drivers. From another viewpoint, however, there is a need to provide drivers with more useful information regarding traffic conditions within the zones.

As another example of information overload, conventional traffic monitoring and reporting systems do not take into account the direction of travel of the motor vehicle. For example, if a motor vehicle is traveling Westbound, the driver has no particular interest in receiving Eastbound traffic information. However, the Eastbound information is provided anyway. Consequently, the drivers using such a system are provided with more information than they require.

On the other hand, in order to assist a driver with avoiding traffic congested areas ahead, it is critical to provide information so that the driver may devise an alternative routing. For example, if a message is received that describes congestion ahead, a driver should be able to act on that message and formulate an alternative route around the congestion. However, as illustrated by the Madnick patent, no provision for formulating alternative routing information is provided by the conventional traffic monitoring and reporting systems.

Moreover, in order to use congestion or alternative routing information effectively, if such information were to be made available, a driver would have to be familiar with the locale and street names in order to take advantage of the information. For example, if a driver were to hear an audio message such as "heavy congestion on Main Street" but did not know the location of Main Street, then such information would not be effectively used. Consequently, a critical need exists for a traffic congestion information system which provides useful information on congestion ahead in a fom which allows either an automated system or a driver to devise alternative routing to get around the congestion. As disclosed in more detail below, the present invention provides such a system.

SUMMARY OF THE INVENTION

Accordingly, it is a primary object of the present invention to provide a system for assimilating traffic condition data from diverse sources, transforming the data into an efficient, unified form, transmitting the unified data to an in-vehicle receiver, and processing and formatting the unified data into useful congestion information in the vehicle for presentation to the vehicle's driver.

It is another object of the present invention to provide a traffic congestion information system that effectively assists a driver to avoid congestion.

It is another object of the present invention to provide a technique for processing traffic condition data of disparate types and differing levels of reliability to produce congestion information related to specific sections of roadway.

It is another object of the present invention to provide a technique for processing traffic congestion information in a motor vehicle so that only the congestion information which is relevant to that vehicle's particular location and heading is displayed to the driver.

It is another object of the present invention to provide an improved in-vehicle congestion information system which provides direction sensitive congestion information for presentation in a motor vehicle on an easy to read map-like display.

It is yet another object of the present invention to provide a traffic congestion information system which can be used in conjunction with existing vehicle navigation devices in order to provide the vehicle's location and heading autonomously to the system.

An improved in-vehicle congestion information system according to the present invention comprises an arrangement which provides real-time traffic congestion information to drivers of vehicles equipped with a suitable receiver and reporting device, to include gathering and formatting traffic condition data into an efficient, unified form at a central location, transmitting the unified data from the central location to a suitable receiver in a motor vehicle, transforming the received data into congestion information with an in-vehicle processor, and displaying the congestion information to the vehicle's driver in a form that is useful for avoiding the areas of congestion.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

Figure 1:
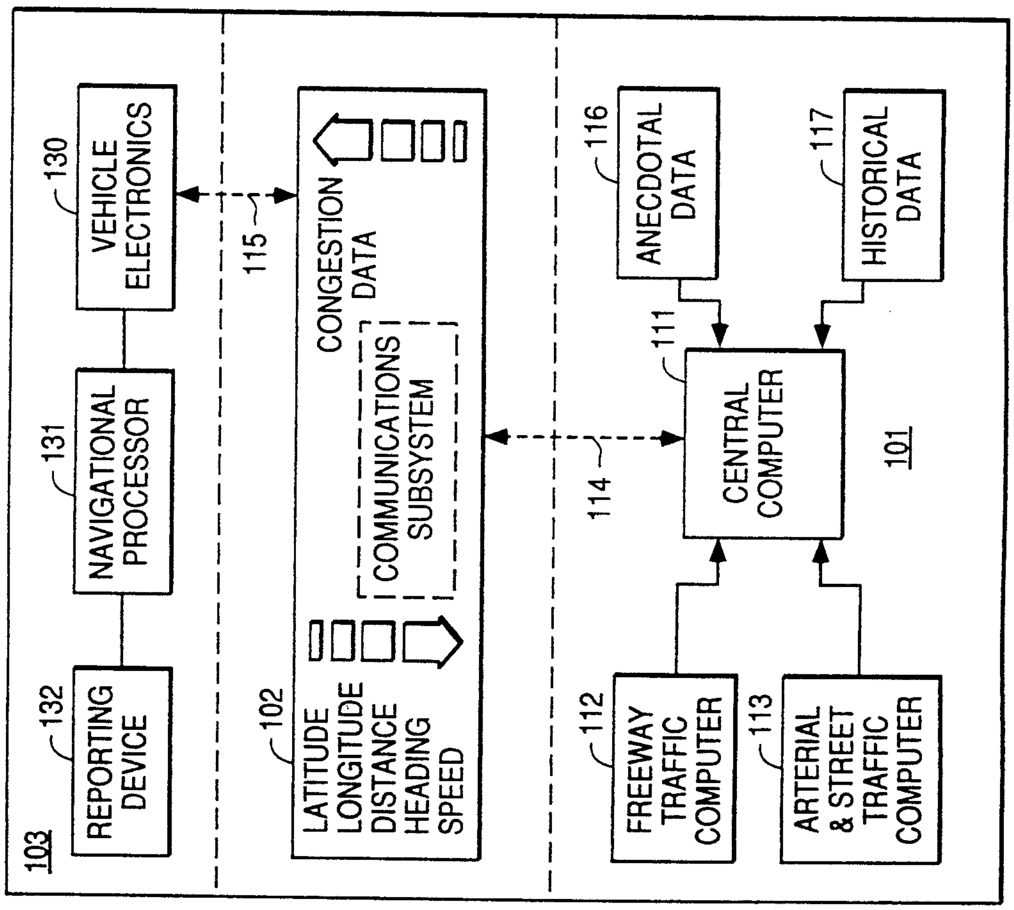
FIG. 1 is an overall functional block diagram of an in-vehicle congestion information system in accordance with a preferred embodiment of the present invention.

Referring to the drawings in detail, wherein like numerals indicate like elements, FIG. 1 is a block diagram of an in-vehicle congestion information system in accordance with a preferred embodiment of the present invention. For illustrative purposes only, such a system will be hereinafter referred to as an ICI (in-vehicle congestion information) system. Referring to FIG. 1, ICI system 100 comprises the following three major subsystems: (1) central subsystem 101 which collects disparate traffic condition data from a variety of sources and transforms the data into a unified form; (2) communication subsystem 102 which broadcasts the unified data to all suitably-equipped vehicles within range of the communications medium, and (3) vehicle processor subsystem 103 mounted in a suitably-equipped vehicle (not shown) which receives the unified data, processes it into real-time congestion information, and reports the processed information to the vehicle's driver.

Central subsystem 101 includes an arrangement of computers or similar data processing equipment at a central location that collect and process raw traffic data and related data from a variety of sources. The raw traffic congestion data comes from a variety of data sources discussed below, and may be in a variety of forms. In order to provide a unified, easy to understand data form, central subsystem 101 converts this raw traffic congestion data into a uniform congestion message for each congested section or "link" of highway as discussed below. Central subsystem 101 includes central computer 111, which processes data received from freeway traffic computer 112, arterial and street traffic computer 113, anecdotal data sources 116, historical data sources 117, and other data sources such as a computer traffic model. Central computer 111 may comprise a personal computer (PC), a mini or a mainframe computer. However, the specific type of computer to be utilized for central computer 111 is not a critical factor with respect to the present invention, and the present invention is not limited thereto. Any processing means that can perform the processing functions of the present invention may be utilized. The outputs of freeway traffic computer 112, and arterial and street traffic computer 113 are coupled to central computer 111. Although a particular arrangement is illustrated for collecting and processing traffic data at a central location, the invention is not limited in this respect, and other arrangements for collecting and processing traffic data may be utilized. For example, one or more of computers 112 or 113 may be located away from the central facility and linked via telephone lines or through other well-known telecommunications media to central computer 111. Alternatively, the present system may be configured to operate without one or both of computers 112 and 113, and to rely on traffic condition data inputs from other sources, such as ancedotal or historical data.

Freeway traffic computer 112 provides central computer 111 with such traffic data as highway or freeway traffic flow in the form of occupancy, which is a highway engineering term describing the percentage of time a particular section of roadway is occupied. An example of a freeway traffic computer system which may be utilized in conjunction with the present invention is the California Department of Transportation's "Smart Corridor" Automated Traffic Monitoring System (SATMS). California's "Smart Corridor" is an instrumented 13 mile section of the Santa Monica Freeway between Santa Monica and downtown Los Angeles. This section of freeway is one of the most heavily travelled routes in the United States. The SATMS computer provides freeway traffic flow data and, as such, is compatible with the present invention. The use of California's SATMS computer as a substitute for freeway traffic computer 112 is described herein for illustrative purposes only, and the present invention is not intended to be limited thereto. It is envisioned that freeway traffic computer 112 may be substituted with any appropriate freeway or highway traffic monitoring system which presently exists or is proposed. The term "freeway" is defined here for the purposes of this invention as applying to any limited access type of roadway including, but not limited to Interstate highways, local freeways, parkways, etc.

Arterial and street traffic computer 113 provides central computer 111 with traffic data for major arteries, streets and intersections, in the form of occupancy. Arterial and street traffic computer 113 also provides data relating to traffic signal operations such as, for example, traffic light timing or malfunctioning lights. Arterial and street traffic computer 113 may be interfaced with various traffic signal controls or control systems which are well known in the art. Such an interface allows traffic light timing and signal operation information to be coupled into the present system. Both freeway traffic computer 112 and arterial and street traffic computer 113 may be compatible with existing municipal or State traffic monitoring systems. However, a proprietary computer system also may be developed and utilized to measure traffic flow and velocity for the purposes of the present invention. The terms "arterial" and "street" are defined here for the purposes of this invention as applying to any non-freeway type road, including but not limited to streets, boulevards, avenues, roads, lanes, and other road surfaces designed to service local traffic.

In addition to the traffic condition data received from freeway traffic computer 112 and arterial and street traffic computer 113, central computer 111 also receives traffic-related data from a number of non-automated sources such as, for example, anecdotal data sources 116 from police and fire reports, accident reports, and commercial radio traffic reports.

As another source of traffic-related information for the present system, a number of individual motor vehicles may be equipped with electronic tracking devices. These tracking devices may be limited to a few instrumented vehicles that are selected to represent a projectable sample of the total vehicle population. Conversely, this type of vehicle tracking information may be provided by a relatively large population of fleet vehicles such as, for example, police, bus or taxi vehicles. Alternatively, as discussed in more detail below, a selected number of individual vehicles utilizing the ICI system instrumentation may be utilized to provide tracking data to central computer 111.

Central computer 111 is arranged to process data from all of the above-described "equipped" vehicles, select a representative sample of vehicles to monitor across a broad geographical area, or monitor just those vehicles in a particular area (in order, for example, to correlate other traffic congestion reports). It is envisioned that vehicle tracking devices could be provided for every vehicle in the geographical area. The data provided from the instrumented vehicles to central computer 111 includes location (latitude and longitude), distance, heading, and velocity. It is also envisioned that the present system may be interfaced with other types of navigational systems, including inertial navigation systems, radio beacon locating systems, satellite navigation systems, etc. One example of such a navigational system is the Bosch Travelpilot, which is manufactured by Bosch of West Germany. Alternatively, the present system's equipment may be used independently of a navigational system, with the driver manually entering the location (a "cell number" as described in more detail below) and direction of travel of the vehicle into an ICI system-equipped processor in the vehicle.

Navigational data is provided to central computer 111 which correlates latitudinal and longitudinal information received from the instrumented vehicles to cell numbers and street names. Conversely, central computer 111 also provides data for interpretation by the processor mounted in an instrumented vehicle, which correlates street names with latitudinal and longitudinal information.

Communication subsystem 102 provides a communications path between central subsystem 101 and vehicle processor subsystem 103. In a preferred embodiment, processed traffic congestion information may be transmitted from central subsystem 101 over data link 114 to communication subsystem 102, and to vehicle processor subsystem 103 over radio link 115. However, the use of a radio link for communicating data between computers is well known and such a link is described herein for illustrative purposes only. Alternately, radio link 115 may be replaced with, for example, a telephone communications interface or infra-red connection. Communication subsystem 102 may, for example, consist of a series of low powered radio transmitters, similar to cellular telephone transponders, located throughout the ICI system traffic congestion monitoring area.

Although only one vehicle processor subsystem 103 is disclosed herein for illustrative purposes, the present invention is not intended to be so limited and may contain numerous properly adapted vehicles. Such vehicles, suitably equipped with ICI system-compatible electronics, transmit tracking data in the form of latitude, longitude, distance, heading, and velocity back to communication subsystem 102 over radio link 115. As discussed above, tracking data received from all suitably equipped vehicles can be processed, or selected vehicles or groups of vehicles may be monitored to correlate particular reports or analyze data for a particular area. Thus, communication subsystem 102 passes on all of the tracking data via data link 114 to central subsystem 101 which may subsequently analyze only select portions or all of the tracking data as discussed above.

Figure 4:
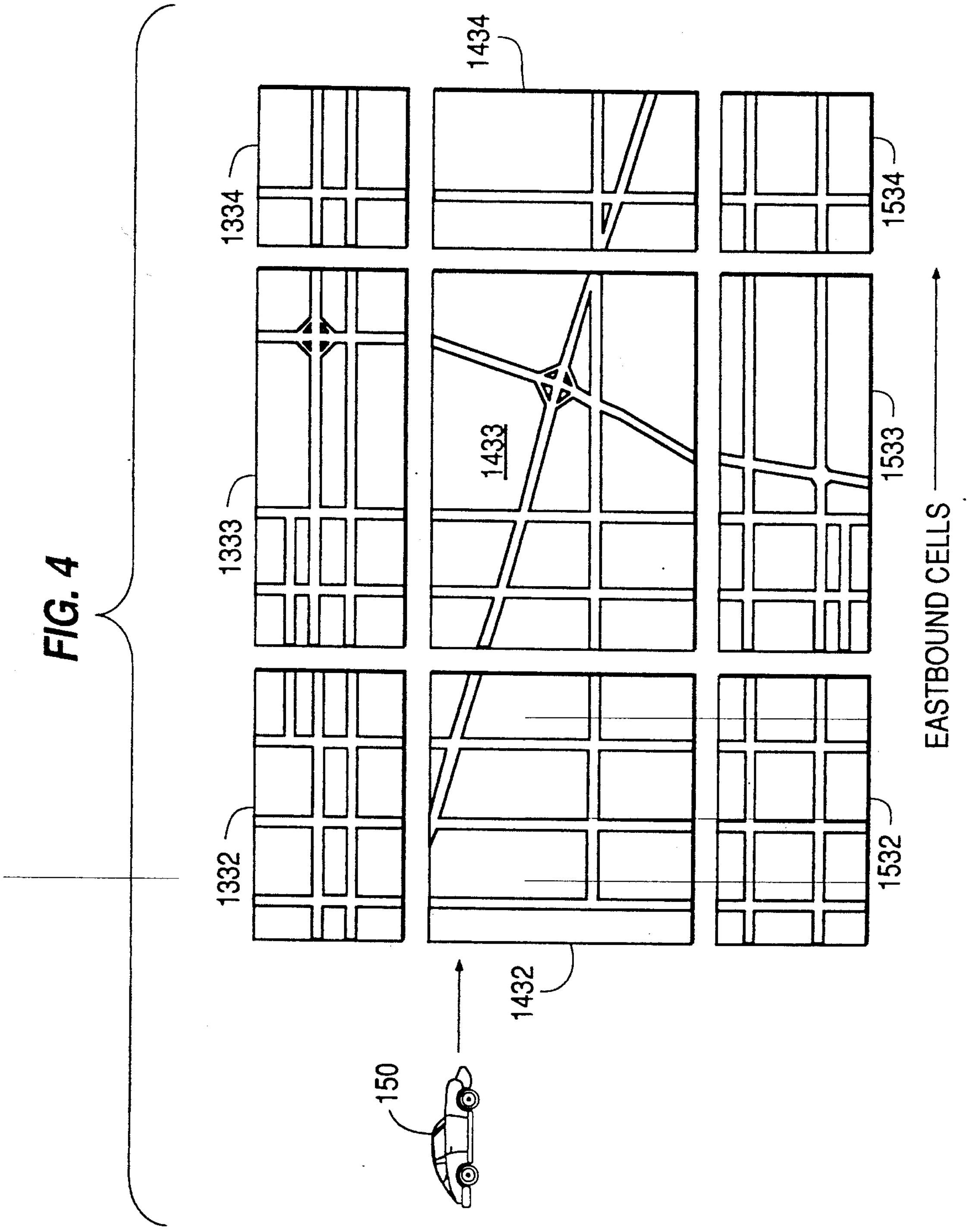
FIG. 4 is a diagram showing an arrangement of a series of cells for a particular location and heading of a vehicle for the system depicted in FIG. 1.

As will be discussed below, the congestion data from central subsystem 101 is transmitted to vehicle processor subsystem 103 over communication subsystem 102 in the form of link messages. These link messages are assembled into cell messages in vehicle processor subsystem 103. A cell is defined by the direction of vehicle travel and the major arterials in an area where the vehicle is travelling. For example, FIG. 4 illustrates cells for vehicle 150 travelling East bound. Vehicle 150 is travelling in cell 1432 which is an East bound cell. Vehicle processor subsystem 103 may process information for those links in cell 1432 as well as adjacent cell 1433. As can be seen in FIG. 4, the cells are generally defined by direction of travel and the major arterials in a given area, with each cell encompassing a link or section of a major arterial up to, but not including, the next major interchange. In the example illustrated by FIG. 4, adjacent cell 1433 includes the next highway interchange including the major arterial links to the North and South.

Vehicle processor subsystem 103 may report congestion information for East bound links in the major arterials in cell 1432, as well as parallel side streets. Vehicle processor subsystem 103 may also report congestion information for East bound links in the major arterials and parallel side streets in cell 1433, as well as congestion information for North and South bound links in the major arteries in cell 1438. In this manner, a driver in vehicle 150 may formulate alternative routing information based upon congestion information.

In addition, congestion information may also be provided for a broader area such as, for example, an area encompassing adjacent cells 1532, 1332, 1533, 1333, 1334, 1434 and 1534 as shown in FIG. 4. The scope of the area of interest may be preset by the system or altered by a driver who enters commands into the system with a key pad. In any event, congestion information is always reported by vehicle processor 103 with regard to the proximity of vehicle 150 to the congestion, or with the nearest congestion messages reported first.

Each message contains congestion information for each section of highway or "link." The data format for transmission of link messages consists of the link number, the congestion level and an optional congestion message. In a preferred embodiment, the congestion portion of the data is transmitted as one byte for each link, with one message representing heavy congestion, another message representing light congestion, and no data transmitted (no message) representing no congestion. If there is no congestion for a particular link then no data is transmitted for that link. All link messages are updated periodically (e.g., once a minute). If an earlier congestion message is no longer being received, vehicle processor subsystem 103 "assumes" that the congestion for that link has cleared up. Vehicle processor subsystem 103 constructs a cell message from the received link messages based upon cell definitions stored in vehicle processor subsystem 103.

Cell messages may be divided into four "layers," with each "layer" corresponding to an ordinate point of the compass (i.e., North, South, East, West). Each layer is composed of different links; however, some links may appear in more than one layer. Thus, a link describing a major North bound arterial, for example, may appear in the North, East and West layers but not in the South layer. However, since each cell is designed to encompass a major arterial up to, but not including the next interchange, the different "layers" would not necessarily overlap. For example, an Eastbound cell "layer" may encompass Highway 5 including the interchange at Exit 1 until just before Exit 2. A West bound cell "layer" for the same section of Highway 5 would include the interchange at Exit 2 until just before Exit 1. Consequently, these "layers" would be offset and not lie directly above one another. Vehicle processor subsystem 103 receives all link messages for all cells, but processes only those which the driver wishes to display. Thus, a driver may discriminate from among data within an area and have displayed or reported only that data which is applicable, for example, to his or her particular direction of travel. Such a cell allocation scheme is described herein for illustrative purposes only. Other cell allocation schemes may be used, for example, such as dividing an area geometrically into sections of interest. As another example, a different number of "layers" may be used to represent either more or less than the illustrated four points on a compass.

Vehicle processor subsystem 103 comprises vehicle electronics package 130, navigational processor 131, and congestion information reporting device 132. Navigational processor 131 and reporting device 132 may, for example, comprise modified component versions of a Bosch Travelpilot. The Bosch Travelpilot is a vehicle navigational system that electronically displays roadmaps on a computer screen in the vehicle. While the vehicle is moving, the position of the vehicle on the television screen remains constant, and the map moves relative to the vehicle. The driver may select expanded views of areas of interest on the display. In addition, a driver may enter the vehicle's destination and see it displayed on the map. Data representing the maps to be displayed may be stored in a compact disc (CD-ROM), DAT, or other appropriate data storage medium located in vehicle electronics package 130. In an embodiment of the present invention, a Bosch Travelpilot may be modified to display congestion data provided by the ICI system, wherein the congestion data are superimposed over the Travelpilot map display. In such a system, the Travelpilot may be utilized to provide tracking data for that vehicle to vehicle electronics package 130, which subsequently transmits the tracking data to central subsystem 101. It is to be noted that other types of vehicle navigation systems may be used as a substitute for a Travelpilot, including a proprietary navigational computer which may be specifically designed for the ICI system. The use of a Bosch Travelpilot is described herein for illustrative purposes only, and should not be construed so as to limit the scope of the present invention.

Congestion information received by vehicle electronics package 130 from communication subsystem 102, may be reported to the driver by any combination of three methods. For example, in accordance with a preferred embodiment of the present invention, congestion information is superimposed on a map overlay and reported by reporting device 132. Different levels of congestion (i.e., heavy or medium) are represented on the overlay by different colors or symbols. Utilizing a second method, the congestion information is displayed as text messages by reporting device 132 or on an appropriate alternate display. For the third method, audio messages may be generated by vehicle electronics package 130 and played over the vehicle's radio speaker (or a dedicated speaker) in order to warn a driver about impending traffic congestion.

Thus, any of the above mentioned message reporting techniques may be used in the ICI system of the present invention. For example, a low cost "bare bones" unit designed for the budget-minded commuter may consist of audio warnings only, with no navigational computer hardware required. Similarly, the ICI system may be offered as an "upgrade" to an existing navigational computer such as the Bosch Travelpilot. As discussed above, the system may be designed to function with another type of navigational system, a proprietary navigational system, or a plurality of different types of navigational systems. Alternately, the ICI system of the present invention could be designed to operate without a navigational system and rely on operator commands, for example, through a keyboard, for cell selection.

Prior to transmitting the link messages, some sort of process is necessary to reduce raw congestion data to a link format and resolve any conflicting data reports. As discussed above, at central subsystem 101, a wide range of congestion information is provided from a variety of sources. Some of this information is in electronic form such as the data provided by freeway traffic computer 112 or arterial and street traffic computer 113. Other sources of congestion information provide data in the form of text, such as the text utilized for maintenance schedules or the video displays of computer-aided dispatch systems. Another type of congestion information is anecdotal data 116, such as police radio reports, telephone reports from drivers with cellular phones, or traffic reports broadcast from commercial radio stations. Consequently, this disparate information, which is provided by many diverse sources is difficult to assimilate for effective use by a driver.

The present invention assimilates a disparate group of traffic-related data from a number of different sources, and transforms the data into a unified form so that the congestion information can be effectively used by a driver. This process of transforming the disparate traffic information into a unified form is hereinafter called a "data fusion" process and is illustrated in FIGS. 2 and 3.

Primarily, there are two problems associated with transforming the disparate traffic data into a unified form. The first problem is to determine which data source may be regarded as the most reliable (i.e., the highest quality source). For example, if multiple sources provide conflicting data for a particular section of highway, then the problem is to determine the highest quality data source available. The second problem is to determine the age of the data. For example, when data initially arrives from a particular source it may be regarded as reliable based upon knowledge of the high quality of the source. However, the reliability of this data may degrade with time, and such data may end up less reliable than that provided by a lower quality source whose data is current.

Figure 2:
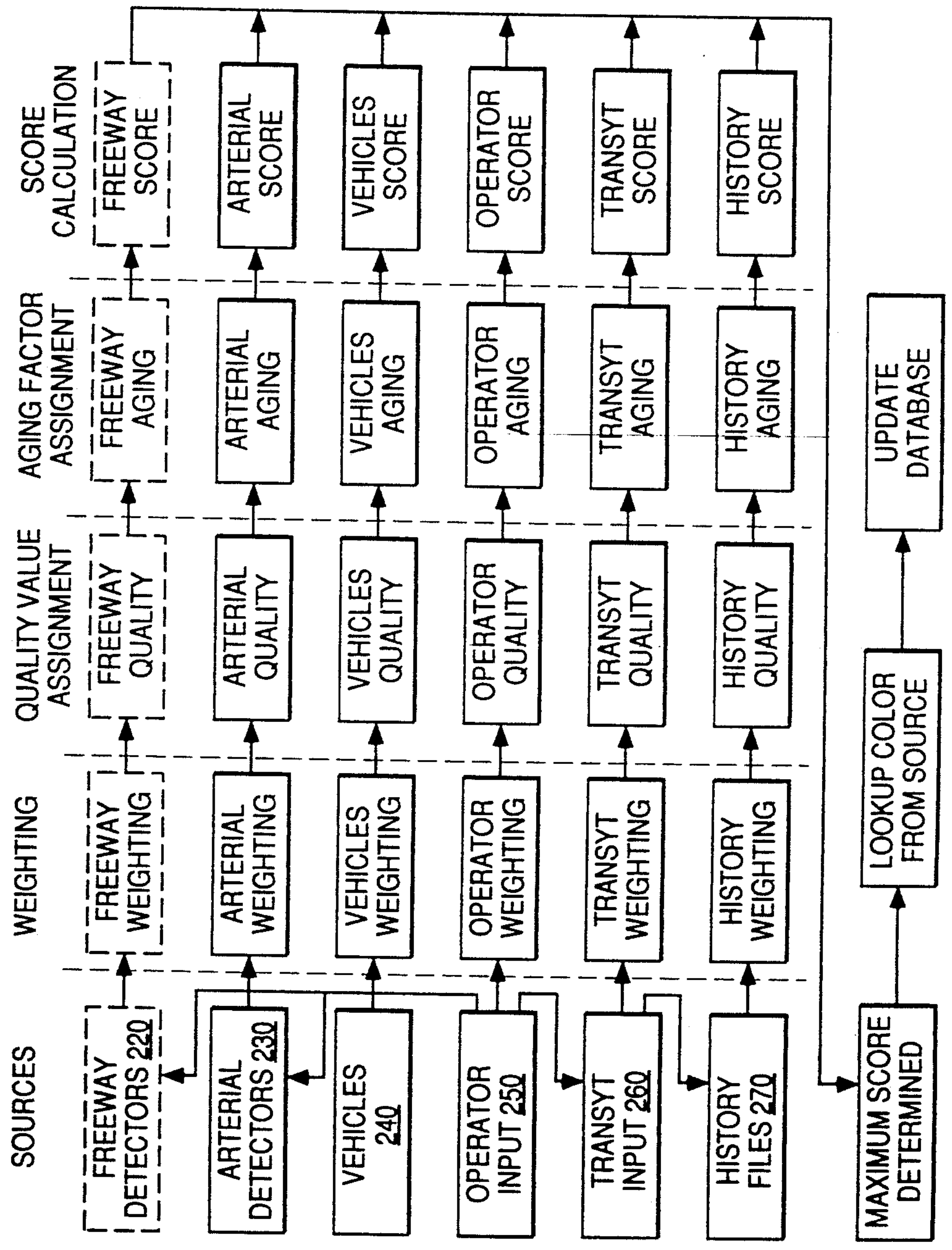
FIG. 2 illustrates a sequence of steps which may be undertaken in a process for fusing data in the system depicted in FIG. 1.
Figure 3:
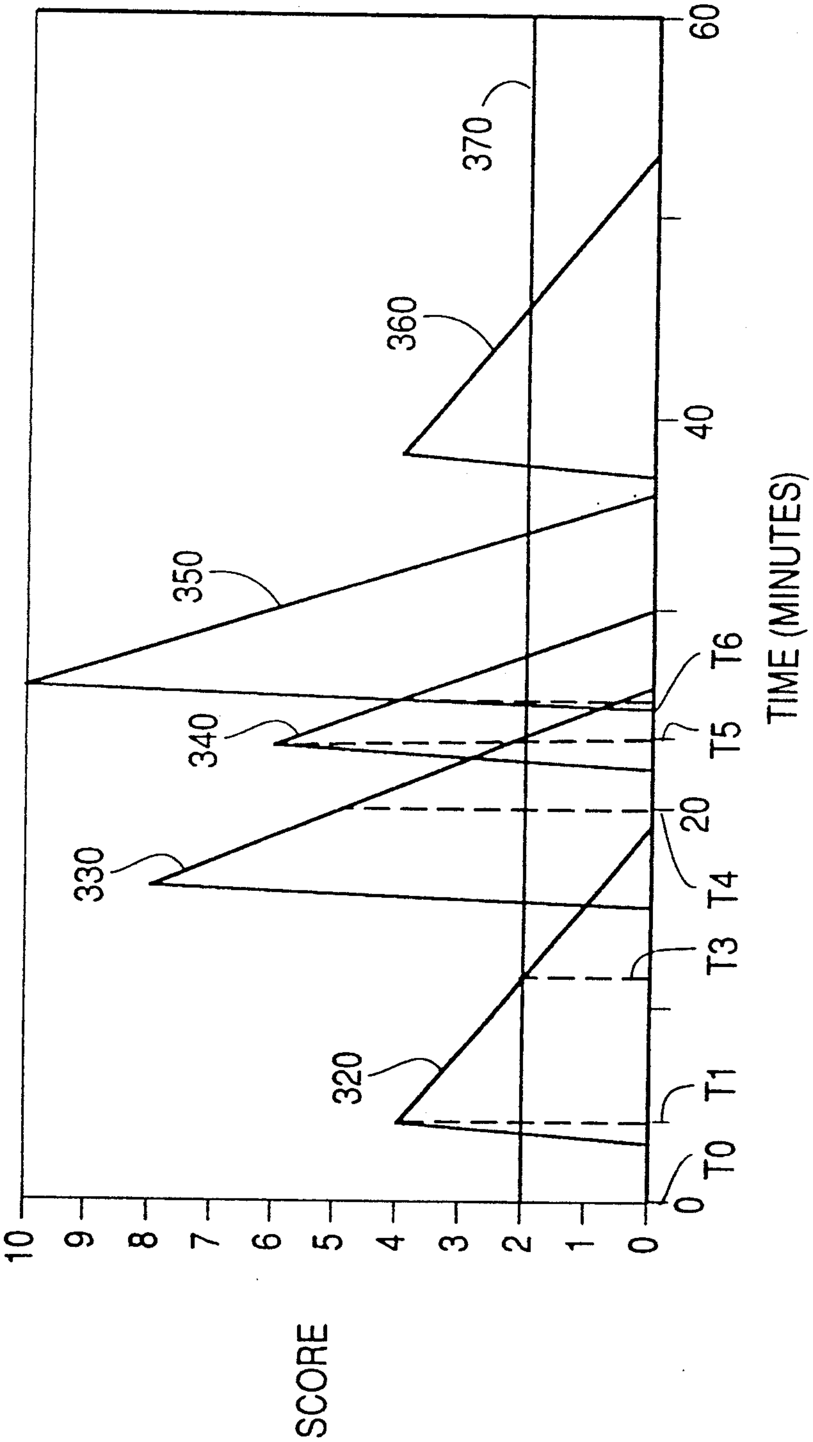
FIG. 3 illustrates the use of an aging factor as a factor for evaluating data in the data fusion process depicted in FIG. 2.

FIG. 2 illustrates a sequence of steps which may be undertaken, in accordance with the present invention, to fuse traffic-related data and solve the problem of determining the reliability and age of traffic-related data. Referring to FIG. 2, six sources of data are shown. Although six sources are described for the purposes of illustration, the present invention is not limited thereto. Freeway detectors 220, such as the California Transportation Department's SATMS discussed above, provide congestion data for area freeways in the form of link occupancy. Arterial detectors 230, such as utilized in a municipal traffic monitoring system, provide congestion data for local arteries and side streets. In addition, as discussed above, arterial detectors 230 may provide information regarding traffic signal operation. Vehicle tracking devices 240 may provide speed, heading, and location data for a plurality of sample vehicles located in the geographical area being served. Operator input 250 provides anecdotal data such as police reports, accident reports, fire emergencies, and traffic reports. TRANSYT is a commonly used computer model that can provide data in signalized networks. The model can provide an estimate of congestion in those links that do not have detectors or other traffic monitors, by interpolating anecdotal data 116 from adjacent links. Finally, history files 270 provides historical data 117 for each link. History files 270 are constantly updated by central subsystem 101 as the latest congestion data is received.

Regardless of the source providing the data, each type of data is processed by the same series of steps: transformation, prioritizing, assigning an aging factor, and decrementing. Each process may be undertaken for every link on the highway network. A link, as discussed above, is defined as one section of roadway, between interchanges or intersections, in one direction.

In the first (weighting) step of the data fusion process shown in FIG. 2, the data from each source undergo a transformation from their original form to a code (or value) that represents a level of congestion for a particular link. This transform is different for each type of data source. For example, data in electronic form are transformed using a series of algorithms that incorporate standard highway engineering parameters. Data from other sources are processed using a similar algorithm, or an operator may simply assign a value to the data as it is entered. The outputs from these transforms are related to different levels of congestion and to the following colors:

Green—no congestion
Yellow—light to moderate congestion
Red—heavy congestion

Each output is allocated a weighting factor with heavier congestion having a higher weighting factor and lighter congestion having a lower weighting factor. For example, heavy (red) congestion may be allocated a weighting factor of 1.1, moderate (yellow) congestion may be weighted 1.0, and no (green) congestion weighted 0.9.

In the second (quality value assignment) step of the data fusion process, each data source is assigned a quality value according to the quality of the source of the data. For example, if a human operator is considered to be more reliable than an electronic input, the operator input data might be assigned a quality value of 10, whereas the electronic source might be assigned a quality value of 5. However, if the electronic source is considered more reliable than the historical data, then the historical data might be assigned a quality value of 3.

In the third (aging factor assignment) step of the data fusion process, each of the data sources is assigned an aging factor reflecting its validity over time. For example, an operator input resulting from a report heard over the radio would have only a short usable life, since no further report from an operator may be provided, and the original situation reported on would quickly change. Each data source is assigned an aging factor, which is equal to the number of minutes the data can be considered reliable.

In the fourth and final step of the data fusion process, the weighting factor, quality value and aging factor are combined to provide a "score" for each data source. The aging factor is first converted into an aging quotient which is analogous to a slope of a straight line. For a particular given time, the aging quotient is calculated as follows:

$$\text{aging quotient} = [1 - n/(\text{aging factor})]$$

Where n is equal to the number of minutes that have elapsed since the data was reported. For example, if a particular data source has an aging factor of 10 minutes, and 6 minutes have elapsed since the last report from that source, then the aging quotient will be [1-6/10] or 0.4.

The score is then calculated by multiplying together the weighting factor, the quality value and the aging quotient as follows:

$$\text{score} = \text{weighting factor} \times \text{quality value} \times \text{aging quotient}$$

As such, the score for a particular data source will decrement linearly over a period of time; eventually reaching zero unless a new report for that source is received in the interim.

As shown above, the weighting factors do not vary much and thus do not have an overall substantial effect on the resulting score. The purpose of the weighting factor is to bias the outcome in favor of heavier congestion data should two data sources with identical quality values report differing levels of congestion for the same link. Alternatively, the weighting factors could be assigned to more disparate values to more heavily emphasize a particular outcome.

FIG. 3 illustrates the aging factor step in the data fusion process for a single link. Referring to FIG. 3, several different types of data are depicted for the same highway link, with each data type assigned an initial quality value and an aging factor. The vertical axis represents score, with 10 representing the highest score, and zero representing no data. The horizontal axis represents time in minutes.

Data plot 320 represents the score for data received from freeway detectors 220. This type of data may not be considered as reliable as other sources of data; however, it is presumed that the level of reliability of freeway detector data does not change radically over time. As shown in FIG. 3, the freeway detector data here has a relatively low initial score of 4 and its curve has a fairly shallow slope.

Data plot 330 represents the score for data received from arterial detectors 230. Such data may be considered more reliable than data from freeway detectors 220, and thus has a relatively high initial score of 8. However, it may be determined that the reliability of arterial detector data is relatively volatile (i.e., subject to change), and thus the score has a steeper slope than the score representing data from freeway detectors 220.

Data plot 340 represents the score for data received from vehicle tracking devices 240. Such data may be considered more reliable than the freeway detector data, but less reliable than arterial detector data, and thus has an initial score of 6. However, because the vehicles being tracked change speeds relatively quickly, the curve has a very steep slope.

Data plot 350 represents the score for data from operator input 250. This type of data may be considered to be the most reliable of the data types depicted, and thus has an initial score of 10. However, because the situation being reported upon may change rapidly between such reports, the score representing data from operator input 250 has the steepest slope.

Data plot 360 represents the score for data from TRANSYT input 260. Because this interpolated data may be considered to have a low reliability, it is shown here as having an initial score of 4. However, it may be determined that such data has a relatively long usable "life," and thus the score has a fairly shallow slope.

Data plot 370 represents the score for historical data for the particular highway link of interest. The data from history files 270 is considered to have a uniform reliability, because it does not change substantially over a period of time. Consequently, data plot 370 from history files 270 does not have a slope but rather has a constant value. Data from history files 270, is programmed to change with a particular time of day (e.g., during the rush hour) or with a particular day of the week (e.g., during the weekends), in order to reflect the daily traffic patterns. Over longer periods of time, the historical data values are evaluated to take into account evolving long term traffic patterns. Although the data in history files 270 may change over time, the reliability of the data is relatively constant. Consequently, the slope of data plot 370 is zero.

Of course, any of the above data sources may be updated (i.e., a new report received) before the score for the old data has "aged" to a value of zero. In that case, the score for that particular data source is reset to its maximum value and the score is again "aged" according to its aging factor.

Referring again to FIG. 2, the data fusion process is completed by calculating the maximum score at a particular point in time, identifying the source of the maximum score and attributing the color of that source to the particular link. For example, referring to FIG. 3, at time T0 the only score present represents the reliability of the data from history file 270, which in this case has a score of 2. At this time, the maximum score is 2 (the only value shown). Consequently, until additional data is provided at time T1, the present system relies solely on historical data.

At time T1, a congestion report is provided to the system from freeway detectors 220. Since the congestion information from a freeway detector is considered to be relatively current (with respect to data from history files 270), the freeway detector data is assigned a maximum score of 4. However, note that after only a few minutes (at time T3), the score from freeway detectors 220 has "aged" sufficiently such that the system would again rely on the data from history files 270.

However, the situation may arise where a variety of data sources are available to choose from. Each of the data plots 330, 340, 350 and 370 may represent conflicting reports of traffic congestion (bearing in mind that the reliability value indicates quality of data, not traffic congestion). As such, it may be unclear which data source should be used. Nevertheless, the present system resolves such a problem. For example, at time T4, data from arterial detectors 230 would be used, since at that time this source has the highest score. However, at time T5, data plot 330 (score of arterial detectors 230) would be eclipsed by data plot 340 (score of vehicle tracking devices 240). At that point in time, the data from vehicle tracking devices 240 would be considered to be the more reliable of the two sources and used to calculate congestion. At time T6, data plot 240 would eventually be eclipsed by data plot 350 (score of operator input 250). Eventually, if there are no further input reports, the scores would "age" to the point where the score representing the data from history files 270 would again predominate.

The above-described data fusion process assumes that, for the most part, there is an appropriate correlation between data from all of the different data sources. In other words, most of the data sources "agree" as to the level of congestion for a particular link. In the case of properly correlated data, the resultant congestion data represents a true indication of the traffic congestion level. If two sources end up having the same score, however, then the source reporting heavier congestion is chosen. In addition, if a portion of the data does not correlate, the present data fusion process also provides an opportunity for an operator to correct the error. For example, incorrect data occasionally may be produced due to operator input error, sensor failure, or some other type of malfunction in the data source portion of the system. If the incorrect data is produced by a chronic problem (e.g., all freeway sensors erroneously report no congestion during a known traffic jam), an operator may "override" the sensor input with manual data whose score would outweigh the other sensors. On the other hand, if an individual sensor intermittently provides incorrect data, the duration of the incorrect report is automatically accounted for and limited by the present process' "aging" factor and scoring process. Similarly, a false alarm or prank report is limited by the aging factor and scoring process and automatically corrected. The present system also accounts for sensors having known but dubious reliabilities, by providing these sensor inputs with lower initial quality values than those from the more reliable data sources.

The specific quality values and aging factors shown in FIG. 3 are disclosed for the purpose of illustration only, and are not intended to limit the scope of the present invention. The quality values and aging factors for specific types of data sources may be determined through a process of experimentation and may be changed as the system is operated and the reliability of each source is appraised.

Referring again to FIG. 1, the present In-Vehicle Congestion Information System transfers the unified congestion data from central computer 111 to communication subsystem 102 via data link 114. In turn, communication subsystem 102 broadcasts the link congestion messages to vehicle processor subsystem 103 in all of the ICI system-equipped vehicles within range of the broadcast transmitter or transmitters. However, as discussed above, only congestion information directly related to an individual driver's location and heading should be provided. The present system provides such a capability, by using a "cell messaging" process to display to an individual driver messages related only to the congestion data which is relevant to that vehicle.

FIG. 4 is a diagram showing an arrangement of "cells" overlaid on a map display, in accordance with the "cell messaging" process of the present invention. Vehicle processor subsystem 103 may use a flux gate compass other type of navigational apparatus, or manual input (e.g., a keypad) to determine the current cell number or heading. When a request for congestion data is made, navigational processor 131 in vehicle processor subsystem 103 determines the heading and the current cell number and then constructs the message for presentation to the driver.

Navigational processor 131 in vehicle processor subsystem 103 uses only the layer of cells appropriate for the current direction of the vehicle, which in this example is the Eastbound layer of cells. The Eastbound cells may only include links in the East direction or may also include major highway links in the North and South directions as well. The cells may be numbered on each layer according to a pattern that enables the processor in the vehicle to provide the congestion data from those cells ahead, and to the left and right, of the driver. Stored in navigational processor 131 is a list of appropriate link numbers for each cell. Navigational processor 131 then "constructs" the cell messages from the appropriate link messages for those cells.

In the example shown in FIG. 4, vehicle processor subsystem 103 in subject vehicle 150 (located in cell 1432) will construct cell messages with the congestion data from links in cell 1432 as well as cell 1433 ahead. The pattern of cells to be used and the total number of congestion messages to be presented to the driver may at any time be preset by the system operator or by the driver. Messages may be presented in order of cell distance from the vehicle such that closer messages are received first.

Although the ICI system requires data transmission of the link messages to the vehicle, the system may be effectively independent of the transmitted data. In the absence of any transmitted data, the system will continue to function. In other words, data need only be transmitted to indicate congested links. If there are no congested areas (e.g., at 3 A.M.) no data will be transmitted. Periodically, and when the vehicle system is first powered up, a "handshake" message may be generated to indicate to the driver that the system is indeed operating properly.

Figure 5:
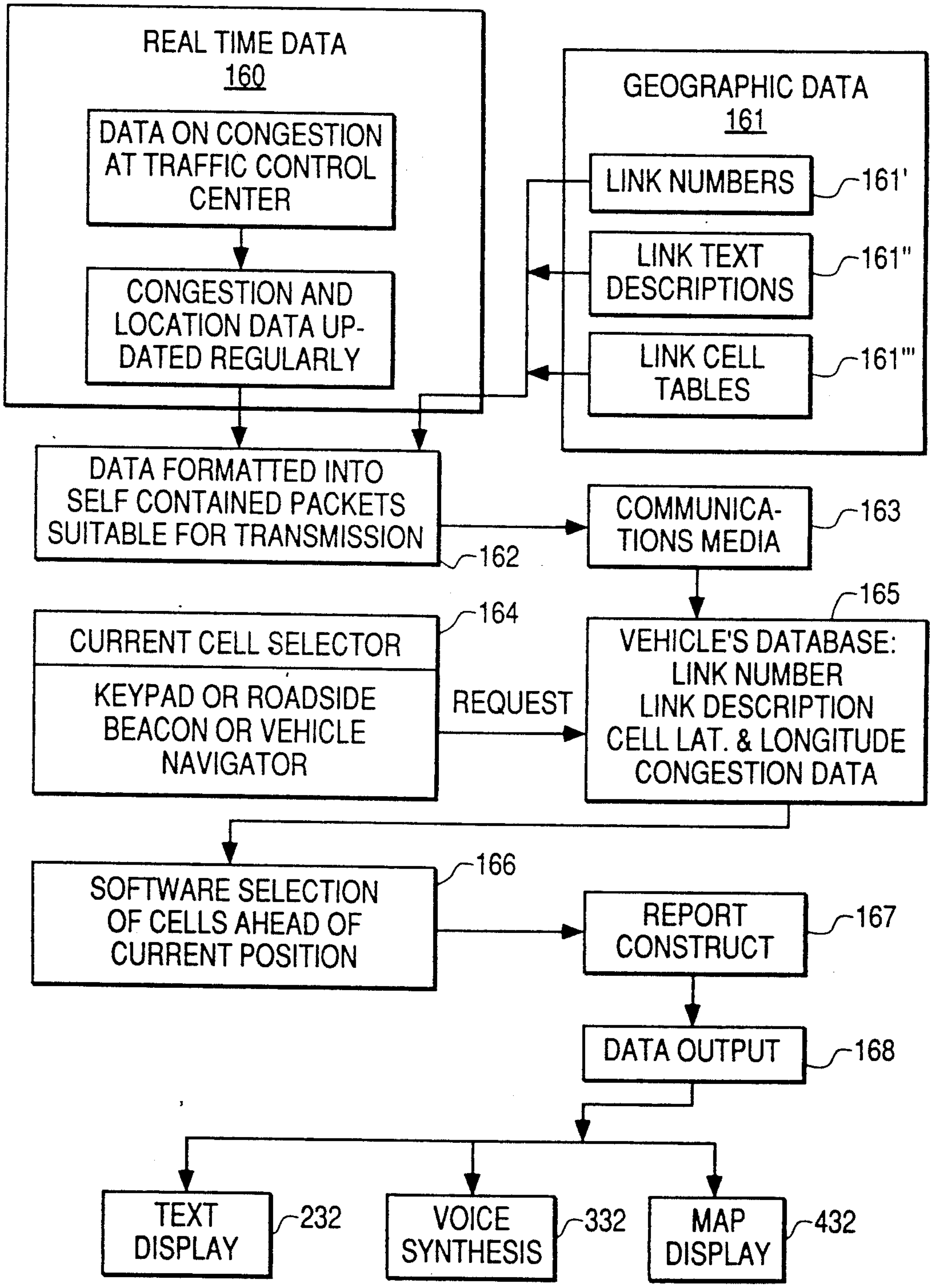
FIG. 5 is a block diagram illustrating the flow of data throughout the system depicted in FIG. 1.

FIG. 5 illustrates data flow within a preferred embodiment of the ICI system. Referring to FIG. 5, real time traffic congestion data 160 is received at central computer 111 (FIG. 1) from a variety of sources such as freeway traffic computer 112 and arterial and street traffic computer 113. Geographic data 161 including link numbers 161', link text descriptions 161'', and link cell tables 161''' are stored in central computer 111. Traffic congestion data 160 and geographic data 161 are combined in central computer 111 in block 162. There the congestion data is formatted into individual link "messages" using the data fusion process described above. The individual link messages are periodically transmitted by communication subsystem 102 to a vehicle's database, as shown in block 163.

A vehicle's database, as shown in block 165, is resident in vehicle electronics package 130 and includes a list of link numbers corresponding to each cell number. The database also includes a text description of each link. This text may be in a form such as "MAIN STREET between FIRST and SECOND". The messages may be stored as text such that they can be read by the voice synthesizer and in addition may be used to construct text messages.

Vehicle processor subsystem 103 requires the current cell number in order to output traffic congestion data for that cell as shown in step 164. The ICI system system may incorporate a keypad that the driver may use to enter the current cell number. This number may be displayed for example, on the side of the various pieces of street "furniture." As usage of the system increases in more heavily travelled highways, low power transmitters located at the side of the road may be used to automatically transmit the current cell number. Alternately, vehicles equipped with autonomous navigation systems (such as the Bosch Travelpilot or other type of navigation system discussed above) may be able to use that navigation system to identify the current cell and heading.

The individual report associated with each congested link may be constructed from a combination of the incoming data and database elements maintained within the vehicle as shown in step 167. Each congestion report contains the link numbers, the congestion level, and an optional incident type number indicating the cause of congestion.

The messages are constructed from this data as follows: The link number may be used to look up the road name which may be kept in the vehicle database. The database description includes the road name and the streets intersecting at the start and end of the link. Thus one link name would include, for example:

MAIN ST, 7th ST, 8th ST.

The incident type number may be one value that corresponds to additional information concerning the specific incident. A list of incident types may be maintained in both the central and vehicle database. The operator at the central system can add the type number to the entry corresponding to the appropriate link. Navigational processor 131, upon receiving the data can look up the appropriate incident type. The incident type table contains a list consisting of such words as: Accident, Flood, Spilled Load, Maintenance, Fire, etc.

Navigational processor 131 in the vehicle generates reports for each link that contains congestion. An example report is illustrated below:

MAIN STREET FROM WASHINGTON TO JEFFERSON
HEAVY CONGESTION

-continued

| SPILLED LOAD |
| --- |

The same report type structure may be used for both the voice and text displays described below.

The ICI system vehicle database can be interpreted and presented to a driver by a series of methods. These methods can vary according to the options installed in any particular vehicle. A text display as shown in block 232, which may be installed in the vehicle as a part of reporting device 132, provides the driver with a small text display mounted within his field of view, either on the dashboard, or as a "head up" type display. When congestion data is received by the processor that is relevant to that driver (e.g., congestion messages for links in those cells corresponding to or adjacent to the current position of the vehicle) then a message such as "MESSAGE WAITING" may be displayed. When a button on a keypad in the vehicle is pressed, the messages appear on the text display.

A voice synthesis option, as shown in block 332, may also be installed in a vehicle as a part of reporting device 132. The operation of such a voice synthesizer may be similar to that of the above-discussed text display, except that voice messages may be sent to the vehicle's radio loudspeakers or to a separate, dedicated speaker.

A map display, as shown in block 432, is the most expensive presentation option, with the screen of a map display system used also to display congestion data. The voice synthesis presentation option or text display may be used in conjunction with such a map display.

Each presentation option may have an associated alerting device which informs the driver that new reports are waiting to be presented. Once alerted, the driver has the option of deciding whether to receive the report or not. The alerting device allows the driver to have the reports presented at a time when his attention is not diverted by a driving maneuver. For example, a text or map display may display "MESSAGE WAITING" and a voice synthesis option may provide a "beep" to indicate that a new message has been received.

Vehicle processor subsystem 103 keeps track of the reports delivered to the driver and ensures that repeated reports are not presented. Thus, if the driver is stuck in a queue in one cell and is continually receiving updates of the same report, then these reports are only presented once.

This invention has been described in detail in connection with the preferred embodiments, but is for illustrative purposes only and the invention is not limited thereto. It will be easily understood by those skilled in the art that variations and modifications can easily be made within the scope of this invention as defined by the appended claims.

I claim:

1. An in-vehicle traffic congestion information system comprising:

central system for receiving raw traffic congestion data and transmitting at least one localized traffic congestion value, said central system comprising:

congestion data input means for inputting raw traffic congestion data from at least one traffic congestion data source;

central processing means, coupled to said congestion data input means, for receiving said raw traffic congestion data and converting said raw traffic congestion data into at least one localized traffic congestion value indicative of a level of traffic congestion for a predetermined section of roadway and assigning a score indicative of the reliability of said at least one traffic congestion data source to said at least one traffic congestion value, selecting a traffic congestion value for a predetermined section of roadway from said at least one traffic congestion data source determined to have a highest score to produce a selected traffic congested value for a predetermined section of roadway; and communication means, coupled to said central processing means, for transmitting said selected traffic congestion value, and a vehicle mounted system for receiving said selected traffic congestion value and outputting a user message, said vehicle mounted system comprising:

receiver means for receiving said selected traffic congestion value, vehicle mounted processing means, coupled to said receiver means, for determining the location of the vehicle, determining if said selected traffic congestion value for said section of roadway is within a predetermined area defined by the location of the vehicle and converting said selected traffic congestion value into at least one user message if said selected traffic congestion value for said section of roadway is within a predetermined area defined by the location of the vehicle, and reporting means, coupled to said vehicle mounted processor means, for reporting said at least one user message to a user.

2. The in-vehicle traffic congestion information system of claim 1 wherein said congestion data input means further comprises computer interface means for interfacing with and inputting data from a freeway traffic data system, an arterial and street traffic data system, or a navigational computer.

3. The in-vehicle traffic congestion information system of claim 1 wherein said congestion data input means further comprises operator input means for interfacing with and inputting data from a human operator.

4. The in-vehicle traffic congestion information system of claim 1 wherein said processing means further comprises storage means for storing and retrieving historical traffic congestion data.

5. The in-vehicle traffic congestion information system of claim 1 wherein said communications means comprises a radio network.

6. The in-vehicle traffic congestion information system of claim 1 wherein said receiver means comprises a radio receiver.

7. The in-vehicle traffic congestion information system of claim 1 wherein said reporting means comprises an audio messaging means for producing an audio user message.

8. The in-vehicle traffic congestion information system of claim 7 wherein said text display comprises a "head-up" type display.

9. The in-vehicle traffic congestion information system of claim 1 wherein said reporting means comprises a text display for displaying user messages.

10. The in-vehicle traffic congestion information system of claim 1 wherein said reporting means comprises a map display means for displaying said user message in graphic form superimposed over a highway map.

11. A central system for receiving raw traffic congestion data and transmitting at least one localized traffic congestion message, said central system comprising:

congestion data input means for inputting raw traffic congestion data from at least one traffic congestion data source, central processing means, coupled to said congestion data input means, for receiving said raw traffic congestion data and outputting at least one localized traffic congestion value indicative of a level of traffic congestion for a predetermined section of roadway and assigning a score indicative of the reliability of said at least one traffic congestion data source to said at least one traffic congestion value, selecting a traffic congestion value for a predetermined section of roadway from said at least one traffic congestion data source determined to have a highest score to produce a selected traffic congested value for a predetermined section of roadway, and communication means, coupled to said central processing means, for transmitting said selected traffic congestion value.

12. The central system of claim 11 wherein said congestion data input means further comprises computer interface means for interfacing with and inputting data from a freeway traffic data system, an arterial and street traffic data system, or a navigational computer.

13. The central system of claim 11 wherein said congestion data input means further comprises operator interface means for interfacing with and inputting data from a human operator.

14. The central system of claim 11 wherein said central processing means further comprises storage means for storing and retrieving historical traffic congestion data.

15. The central system of claim 11 wherein said communications means comprises a radio network.

16. A vehicle mounted system for receiving a selected traffic congestion value and outputting a user message, said vehicle mounted system comprising:

receiver means for receiving said selected traffic congestion value, vehicle mounted processing means, coupled to said receiver means, for determining the location of the vehicle, determining if said selected traffic congestion value for said section of roadway is within a predetermined area defined by the location of the vehicle and converting said selected traffic congestion value into at least one user message if said selected traffic congestion value for said section of roadway is within a predetermined area defined by the location of the vehicle, and reporting means, coupled to said vehicle mounted processor means, for reporting said at least one user message to a user.

17. The vehicle mounted system of claim 16 wherein said receiver means comprises a radio receiver.

18. The vehicle mounted system of claim 16 wherein said reporting means comprises an audio messaging means for producing an audio user message.

19. The vehicle mounted system of claim 16 wherein said reporting means comprises a text display for displaying user messages.

20. The vehicle mounted system of claim 19 wherein said text display comprises a "head-up" type display.

21. The vehicle mounted system of claim 16 wherein said reporting means comprises a map display means for displaying said user message in graphic form superimposed over a highway map.

22. A method of collecting, processing, transmitting and reporting traffic congestion data comprising the steps of:

collecting raw traffic congestion data from at least one source of traffic congestion information, processing said raw traffic congestion data from at least one source of traffic congestion information to produce at least one traffic congestion value indicative of a level of traffic congestion for a predetermined section of roadway, assigning a score indicative of the reliability of said at least one source of traffic congestion information to said at least one traffic congestion value, selecting the traffic congestion value for a predetermined section of roadway from a source of traffic congestion information determined to have a highest score, determing whether said selected traffic congestion value for a particular section of roadway exceeds a predetermined threshold, formatting said traffic congestion value into at least one traffic congestion message for said particular section of roadway if said selected traffic congestion value for said particular section of roadway exceeds said predetermined threshold, transmitting said traffic congestion message, receiving said traffic congestion message in a vehicle, determining the location of the vehicle, forming at least one user message from at least one received localized traffic congestion message if said section of roadway is within a predetermined area defined by the location of the vehicle, and reporting said user message to said user.

23. The method of claim 22 wherein said collecting step further comprises the step of inputting data from a freeway traffic data system, arterial traffic data system, or navigation computer.

24. The method of claim 22 wherein said collecting step further comprises the step of manually inputting traffic congestion reports.

25. The method of claim 22 wherein said collecting step further comprises the step of inputting historical traffic congestion data.

26. The method of claim 22 wherein said transmitting step comprises the step of transmitting said at least one localized traffic congestion message over a radio network.

27. The method of claim 22 wherein said reporting step comprises the step of generating an audio user message.

28. The method of claim 22 wherein said reporting step comprises the step of displaying a user message in test form.

29. The method of claim 22 wherein said reporting step comprises the step of displaying said user message in graphic form imposed over a highway map.

* * * * *